Patented Jan. 19, 1937

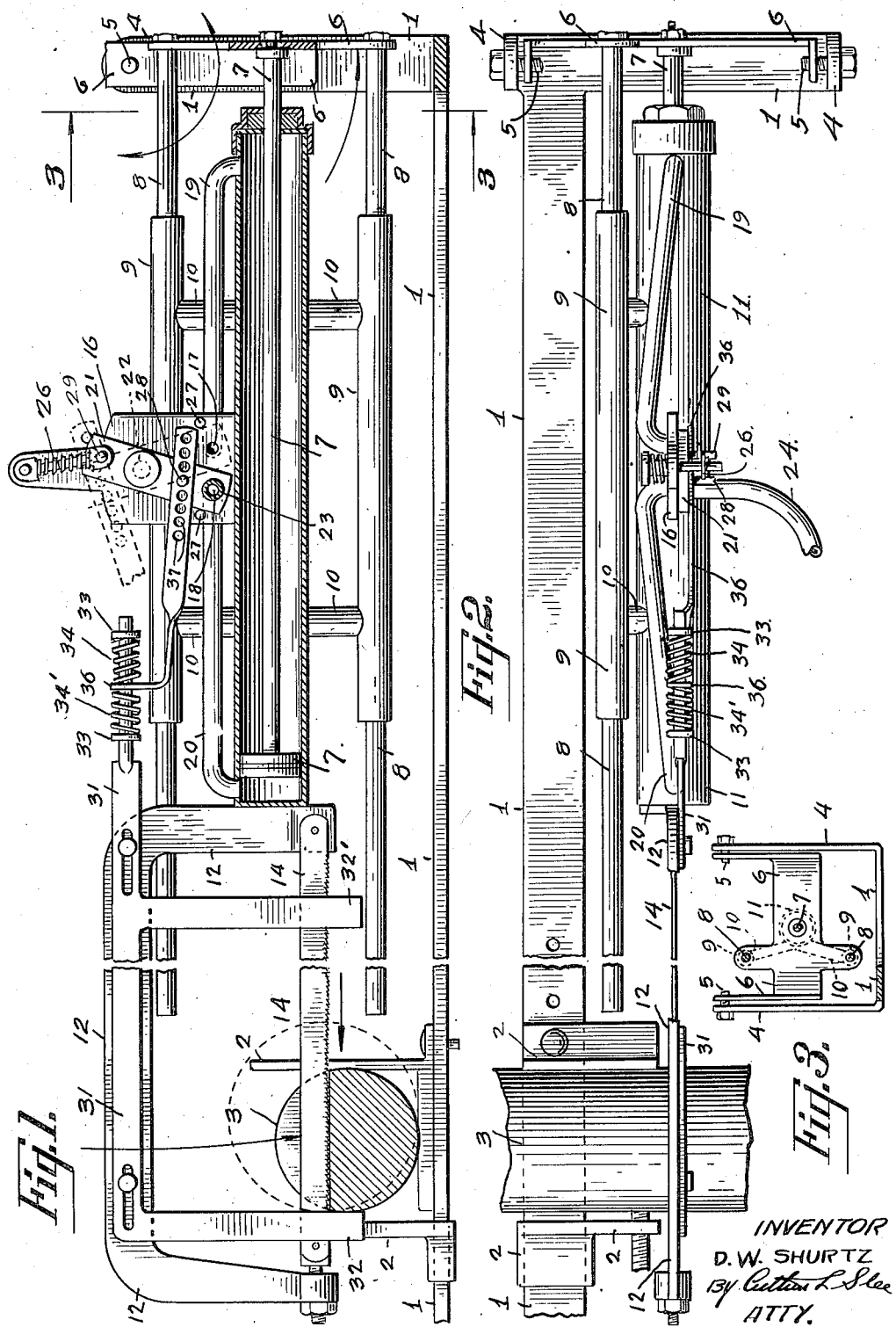

2,068,201

UNITED STATES PATENT OFFICE 2,068,201

POWER SAW

Douglas W. Shurtz, Modesto, Calif.

Application March 16, 1936, Serial No. 69,120

7 Claims. (Cl. 29—73)

My invention relates to improvements in power saws, and particularly hack saws, wherein a reciprocating mechanism for said saw operates in conjunction with tripping means, for controlling and reversing said reciprocating mechanism, at each end of the saw stroke and automatically controlled by the sawed dimension of a work piece being sawed to permit an engaging relation of said saw with said work piece throughout substantially the entire length of said saw, regardless of any size of a work piece within the length of said saw.

The primary object of the present invention is to provide a new and improved power saw having improved means for automatically regulating the length of a saw stroke to produce an engaging relation of said saw with a work piece throughout substantially the entire length of the saw blade at each stroke thereof in order to utilize substantially the entire cutting length of the saw and thereby effect a greater economic use of saw blades.

Another object is to provide a new and improved power saw having improved means for automatically regulating the length of a saw stroke to any size of work piece within the cutting length of a saw.

A further object is to provide a new and improved device of the character set forth in which the actuating mechanism of said saw operates to hold the saw to the work piece during the cutting stroke to effect a more efficient cutting operation and to release, partially, said saw from said work during the return or non-cutting stroke.

I accomplish these and other objects by means of the improved device disclosed in the drawing of the present application, and in which—

Fig. 1 is a broken front elevation, partly in section, disclosing my improvement as applied to a hack saw;

Fig. 2 is a broken plan view thereof; and

Fig. 3 is a reduced sectional view, taken on line 3—3 of Fig. 1, in the direction indicated.

Referring to the drawing:

The numeral 1 is used to designate what I term, for convenience, a work holding frame having a suitable vice or clamping means 2, for holding a work piece 3 to be sawed, at one end thereof. The other end of said frame 1 is provided with a pair of vertically disposed extensions 4 from the upper ends of which is suspended pivotally, as at 5, a gate 6.

One end of a suitable piston 7 is secured to the gate 6 below said and thereby tangentially suspended from the pivotal point 5 as disclosed in Fig. 1 of the drawing. A pair of parallel guides 8 is also secured to the gate 6 and arranged one above and one below and both slightly to one side of the piston 7. Sleeves 9 are slidably mounted upon the guides 8 and are connected by means of braces 10 to each other and to the cylinder 11, thereby operating as a support for said cylinder.

A saw frame 12 is secured to one end of the cylinder 11 and a hack saw blade 14 is attached to said frame 12 in the usual manner.

A valve member 16 is mounted upon the cylinder 11 and comprises a pair of ports 17 and 18 from which tubular connections 19 and 20, respectively, lead into opposite ends of the cylinder 11. A valve 21 is pivotally mounted upon the member 16 as at 22 and has a port 23 registerable with the ports 17 and 18, the said port 23 having a flexible connection, such as a rubber hose 24, or the like, to a source of compressed air or other fluid pressure, not shown.

The valve 21 has attached thereto a tension member, indicated in general by the numeral 26, for normally retaining said valve off center and against either one of two stops or pins 27 and the port 23 in registration with either port 17 or 18. The valve 21 is also provided with pins 28 and 29 on opposite sides of its pivotal point 22.

Slidably mounted upon the saw frame 12 is a tripping member 31 provided with extensions 32 and 32' extending laterally across and adjacent the ends of the saw or blade 14, as disclosed in Fig. 1 of the drawing, the purpose of which will hereinafter be more fully set forth.

One end of the tripping member 31 is provided with a pair of collars 33 between which are interposed a pair of springs 34 and 34' and between said springs is slidably mounted upon said tripping member 31 one end of a link 36 having in its opposite end a plurality of apertures 37, one of which apertures is engaged by the pin 28 of the valve 21, to operate the same.

In operation:

After the work piece 3 is securely adjusted and clamped within the vice or clamping means 2 on the work holding frame 1 and the saw or blade 14 is adjusted to the cut to be made, the flexible connection 24 is connected to a source of fluid pressure, not shown.

Pressure entering through said connection 24 and the port 23 of the valve 21 passes through the port 18 and tubular connection 20 to the end of the cylinder 11 and beyond the outer end of the piston 7 therein. Reacting upon the head of said piston 7 the pressure moves the cylinder 11, saw frame 12 and saw 14 attached thereto across the work piece 3 until the projection 32' of the tripping member 31 impacts said work piece 3, regardless of the size of said piece 3, when continued movement of said cylinder 11, frame 12 and saw 14 will cause the stopped tripping member 31 to build up a tension in the spring 34', as the link 36 also moves with said cylinder, until the tension of said spring 34' is greater than the resistance offered by the tension member 26, when the valve 21 will be moved by said tension of the spring 34' to its opposite position where the port 23 will register with the port 17 and the actuating fluid pressure will be conveyed, through the tubular connection 19, to the opposite end of the cylinder 11 and upon the opposite side of the piston 7 therein. This will cause the direction of movement of the cylinder 11 to be reversed. The cylinder 11 and saw 14 will then be reciprocated to the return stroke at the end of which the projection 32 will impact the work piece 3 on the opposite side thereof when the above described operation will be repeated.

As the piston 7 is suspended tangentially of the pivotal point 5 of the gate 6, the reaction of a fluid pressure upon the head of said piston 7 will tend to move said piston, cylinder 11, frame 12 and saw 14, during a cutting stroke, around said pivotal point 5 and away from a substantially horizontal position and downwardly onto the work piece 3, thereby exerting a pressure of said saw 14 onto said work, thereby increasing the cutting efficiency of said saw. It is obvious that upon the return or non-cutting stroke, the fluid pressure upon the opposite side of the piston 7 will tend to pull the gate 6 toward the work piece 3 and thereby tend to raise the blade 14 from said work, thereby reducing resistance of the saw blade on the return or non-cutting stroke.

It is also obvious that it is never necessary to readjust the positions of the projections 32 and 32' of the tripping mechanism 31 to the size or position of any work piece whose size is within the length of the blade 14 in order to effect an engaging relation of the saw with said work piece throughout substantially the entire length of the saw. As the tripping mechanism is carried by the saw reciprocating means the stroke of the saw is only reversed when the end of said saw encounters or impacts the piece being sawed. Therefore the blade may travel its full length through a work piece before being reversed.

Having described my invention what I claim is—

1. A power saw comprising a frame; a saw attached to said frame; a piston; means for connecting said piston to a work piece; a fluid pressure actuated cylinder secured to said frame and slidably mounted upon the piston; valve means carried by said cylinder for directing a fluid pressure into either end of said cylinder; and valve reversing means at both ends of said saw and actuated by impact with a work piece at either end of a stroke of said saw to reverse said valve means to permit an engaging relation of said saw with said work piece throughout substantially the entire length of said saw, regardless of the size of any work piece within the length of said saw.

2. A power saw comprising a saw frame; a saw attached to said frame; a substantially stationary piston; means for pivotally connecting said piston to a work piece; a fluid actuated cylinder slidably mounted upon said piston and secured to said saw frame; valve means carried by said cylinder for directing a fluid pressure into either end of said cylinder; and valve reversing means slidably mounted upon the saw frame and projecting across both ends of said saw and actuated at either end of a saw stroke by impact with a work piece being sawed to reverse said valve means at the end only of each saw stroke to permit an engaging relation of said saw with said work piece throughout substantially the entire length of said saw, regardless of the size of any work piece within the length of said saw.

3. A power saw comprising a saw frame; a saw attached to said frame; means for operatively connecting said piston to a work piece; a fluid pressure actuated cylinder slidably mounted upon said piston and secured to the saw frame; valve means carried by said cylinder for directing a fluid pressure into either end of said cylinder for reciprocating the same; and valve reversing means connected to said valve means and slidably mounted upon the saw frame and provided with projections extending laterally to and adjacent the ends of said saw and actuated by impact with a work piece for reversing said valve means only when the end of said saw reaches said piece, to permit an engaging relation of said saw with said work piece throughout substantially the entire length of said saw.

4. A power saw comprising a work holding frame; clamping means, for holding a work piece, at one end of said frame; a piston having one end thereof tangentially suspended from the other end of said frame; a fluid pressure actuated cylinder slidably mounted upon the other end of said piston; a saw frame secured to said cylinder; a saw attached to said saw frame; valve means carried by said cylinder for directing a fluid pressure into either end of said cylinder for reciprocating said cylinder upon said piston; and valve reversing means operatively connected to the valve means and slidably mounted upon the saw frame and having projections extending laterally and across the ends of said saw and actuated only by impact of said projections with a work piece when one end of said saw reaches said work piece to permit an engaging relation of said saw with said work piece throughout substantially the entire length of said saw.

5. A power saw comprising the combination with a saw and reciprocating means therefor, of tripping means for controlling said reciprocating means arranged at each end of said saw and actuated by impact with a work piece only when one end of said saw reaches said work piece to permit an engaging relation of said saw with said work piece throughout substantially the entire length of said saw.

6. A power saw comprising the combination with a saw and reciprocating means therefor of tripping means for controlling said reciprocating means and arranged at each end of said saw and actuated by impact with a work piece when the end of said saw reaches said work piece to automatically adjust the length of a saw stroke to said work piece, regardless of the size of any work piece within the length of said saw.

7. An automatic saw stroke adjusting mechanism for permitting an engaging relation of a saw with a work piece throughout substantially the entire length of said saw, regardless of the length of any work piece within the length of said saw, comprising the combination with a saw and reciprocating means therefor of tripping means operatively connected to and controlling said reciprocating means and extending to each end of said saw and actuated only when said end reaches said work piece by impacting said work piece.

DOUGLAS W. SHURTZ.